(12) United States Patent
Nordman

(10) Patent No.: US 8,262,823 B2
(45) Date of Patent: *Sep. 11, 2012

(54) WINDOW SKIN PANEL AND METHOD OF MAKING SAME

(75) Inventor: Paul S Nordman, Renton, WA (US)

(73) Assignee: The Boeing Company, Chicago, IL (US)

( * ) Notice: Subject to any disclaimer, the term of this patent is extended or adjusted under 35 U.S.C. 154(b) by 1631 days.

This patent is subject to a terminal disclaimer.

(21) Appl. No.: 10/654,765

(22) Filed: Sep. 4, 2003

(65) Prior Publication Data

US 2005/0051255 A1 Mar. 10, 2005

(51) Int. Cl.
*B29C 70/68* (2006.01)
*B64C 1/14* (2006.01)

(52) U.S. Cl. ............... 156/108; 156/307.7; 156/330; 244/129.3

(58) Field of Classification Search ............... 244/129.3; 156/108, 307.7, 330
See application file for complete search history.

(56) References Cited

U.S. PATENT DOCUMENTS

| | | | | | |
|---|---|---|---|---|---|
| 2,322,582 | A | * | 6/1943 | Marini | 52/208 |
| 3,074,832 | A | * | 1/1963 | Graff | 428/38 |
| 3,081,205 | A | * | 3/1963 | Shorr | 52/208 |
| 3,534,004 | A | * | 10/1970 | Luvisi | 525/285 |
| 3,953,630 | A | * | 4/1976 | Roberts et al. | 428/38 |
| 4,004,388 | A | * | 1/1977 | Stefanik | 52/204.593 |
| 4,277,294 | A | * | 7/1981 | Orcutt | 156/102 |
| 4,793,108 | A | * | 12/1988 | Bain et al. | 52/208 |
| 5,039,566 | A | | 8/1991 | Skubic et al. | |
| 5,500,272 | A | * | 3/1996 | Padden | 428/140 |
| 5,665,450 | A | | 9/1997 | Day et al. | |
| 5,885,714 | A | * | 3/1999 | Demeester | 428/441 |
| 6,082,674 | A | | 7/2000 | White et al. | |
| 2003/0082341 | A1 | | 5/2003 | Chu | |

FOREIGN PATENT DOCUMENTS

| | | |
|---|---|---|
| JP | 10-36139 | 2/1998 |
| WO | WO 00/20275 | 4/2000 |

* cited by examiner

*Primary Examiner* — Michael Tolin
(74) *Attorney, Agent, or Firm* — Harness, Dickey & Pierce, P.L.C.

(57) ABSTRACT

A lightweight, structurally strong skin panel having one or more transparent areas forming see-through windows, and a method of making same. A pre-impregnated resin tape comprised of a plurality of fibers impressed into a resin is provided. A metal sheet is provided. The pre-impregnated resin tape and the metal sheet are layered onto a molding tool such that the metal sheet and the pre-impregnated resin tape are aligned one atop the other. The tool, metal sheet, and pre-impregnated resin tape are heated such that the resin flows and at least partially covers the metal sheet and the fibers. The resin and fibers are substantially transparent to form a see-through window portion in the skin panel. The transparent window skin panel eliminates the bulky and heavy frame structure traditionally employed on aircraft, and which has heretofore limited the size of aircraft windows.

20 Claims, 2 Drawing Sheets

WINDOW SKIN PANEL AND METHOD OF MAKING SAME

FIELD OF THE INVENTION

The present invention relates to transparent window skin panels, and more particularly to a laminated transparent window skin panel and method of making same particularly well adapted for use in aircraft and aerospace applications.

BACKGROUND OF THE INVENTION

Passenger windows in most commercial aircraft are relatively small in size. This is due, in part, to the limited capabilities of current transparent window materials and also due to the heavy and complex support structure needed to support these windows within the frame of the aircraft.

Typically, these transparent window materials consist of a transparent polymer. While very successful and exhibiting such useful qualities as high durability and easy formation of complex shapes, these polymer windows do have a limited strength capability.

However, windows made from transparent materials require the heavy support structure in order to support the window within the structural skin of the aircraft. This support structure generally includes window forgings, window panes, and stringers. Each component is designed to strengthen the skin panel which surrounds and supports the window. However, each component added in turn increases the cost and weight of the completed window assembly, thereby providing an incentive to keep passenger windows relatively small.

Accordingly, it would be highly desirable to provide a method of making a transparent window skin panel for use with an aircraft that provides an integrally formed transparent window that is both stronger and lighter than current passenger windows.

SUMMARY OF THE INVENTION

A transparent window skin panel for use in a mobile platform is provided. The transparent window skin panel includes a plurality of metal sheets. A fiber reinforced resin at least partially surrounds the plurality of metal sheets. The fiber reinforced resin is transparent. A cutout is formed within each of the plurality of metal sheets. The cutout corresponds to a window in the transparent window skin panel.

A method of manufacturing the transparent window skin panel is also provided. The method includes using a pre-impregnated resin tape comprised of a plurality of fibers impressed into a resin and a metal sheet. The pre-impregnated resin tape and the metal sheet are layered onto a tool such that the metal sheet and the pre-impregnated resin tape are aligned one atop the other. The tool, metal sheet, and pre-impregnated resin tape are heated such that the resin flows to partially cover the metal sheet and the fibers. The resin and fibers are substantially transparent to form a substantially see-through window portion in the skin panel.

The skin panel forms a lightweight yet structurally strong panel that provides the important benefit of a generally see-through portion.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
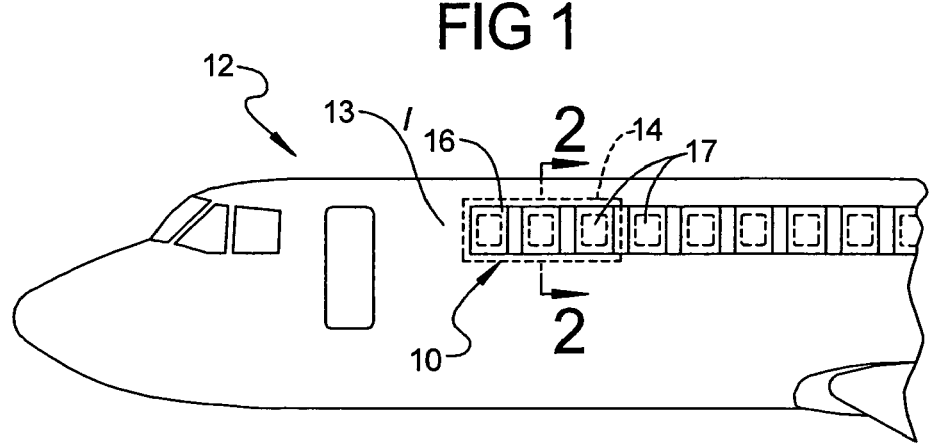
FIG. 1 is a partial view of a front of an aircraft having a transparent window skin panel constructed according to the principles of the present invention.

Referring to FIG. 1, there is illustrated a transparent window skin panel 10 constructed according to the principles of the present invention shown mounted to an aircraft 12. The aircraft 12 generally includes a skin 13. The transparent window skin panel 10 includes a frame 14 and a plurality of windows 16. While in the particular example provided, the transparent window skin panel 10 is illustrated as including three side windows of the aircraft 12, it is to be understood that the transparent window skin panel 10 may be used in any portion of the aircraft 12 and have a single window or any plurality of windows. Prior art windows, indicated by reference numeral 17, are shown relative to the transparent window skin panel 12. As can be seen, the windows 16 are much larger than the prior art windows 17.

Figure 2:
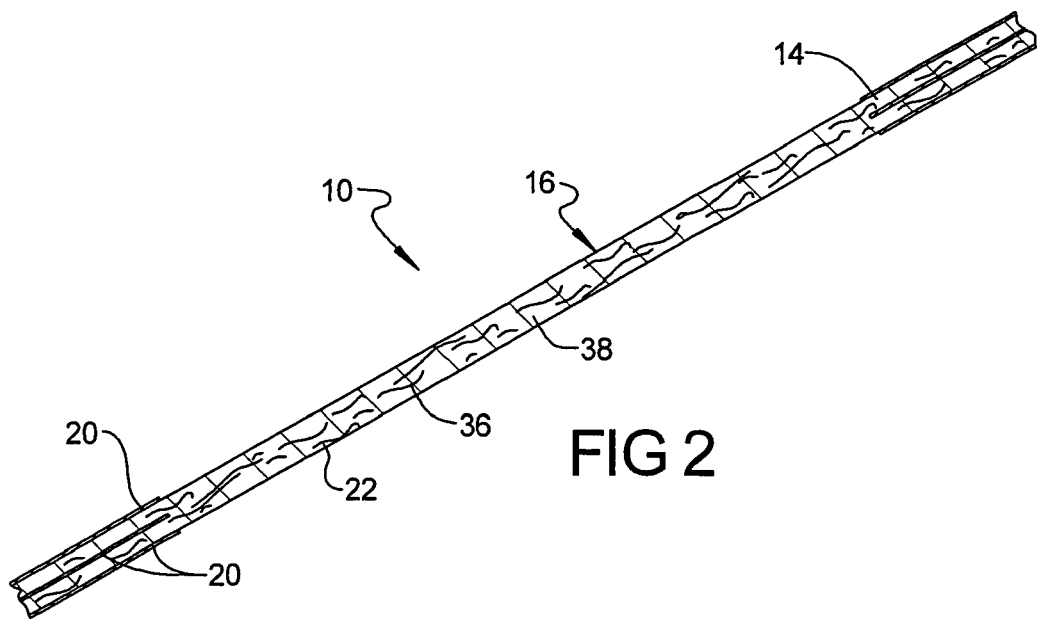
FIG. 2 is a side cross sectional view of the transparent window skin panel taken in the direction of arrow 2-2 in FIG. 1.

With reference to FIG. 2, the transparent window skin panel 10 is coupled to the structural skin (not shown) of the aircraft 12. The frame 14 includes a plurality of metal sheets, rigid structural panels, for example and a fiber reinforced resin 22. The metal sheets 20 are suspended within the fiber reinforced resin 22. In the particular example provided, three metal sheets 20 are illustrated. It is to be understood, however, that a greater or lesser number of metal sheets 20 may be used as are desired. Moreover, while the metal sheets 20 are illustrated as spaced on each side of the fiber reinforced resin 22 and within the fiber reinforced resin 22, the metal sheets 20 may be located anywhere within the fiber reinforced resin 22, as will be described in greater detail below.

The windows 16 are preferably comprised solely of the fiber reinforced resin 22 which extends between the frame 14. The fiber reinforced resin 22 is transparent for allowing viewing therethrough as will be described in greater detail below.

The transparent window skin panel 10 is preferably lap spliced to the skin 13 (FIG. 1) of the aircraft 12. This lap splice (not shown) results in a high strength coupling wherein the transparent window skin panel 10 is mechanically fastened to an adjacent skin panel of the aircraft skin 14.

Figure 3:
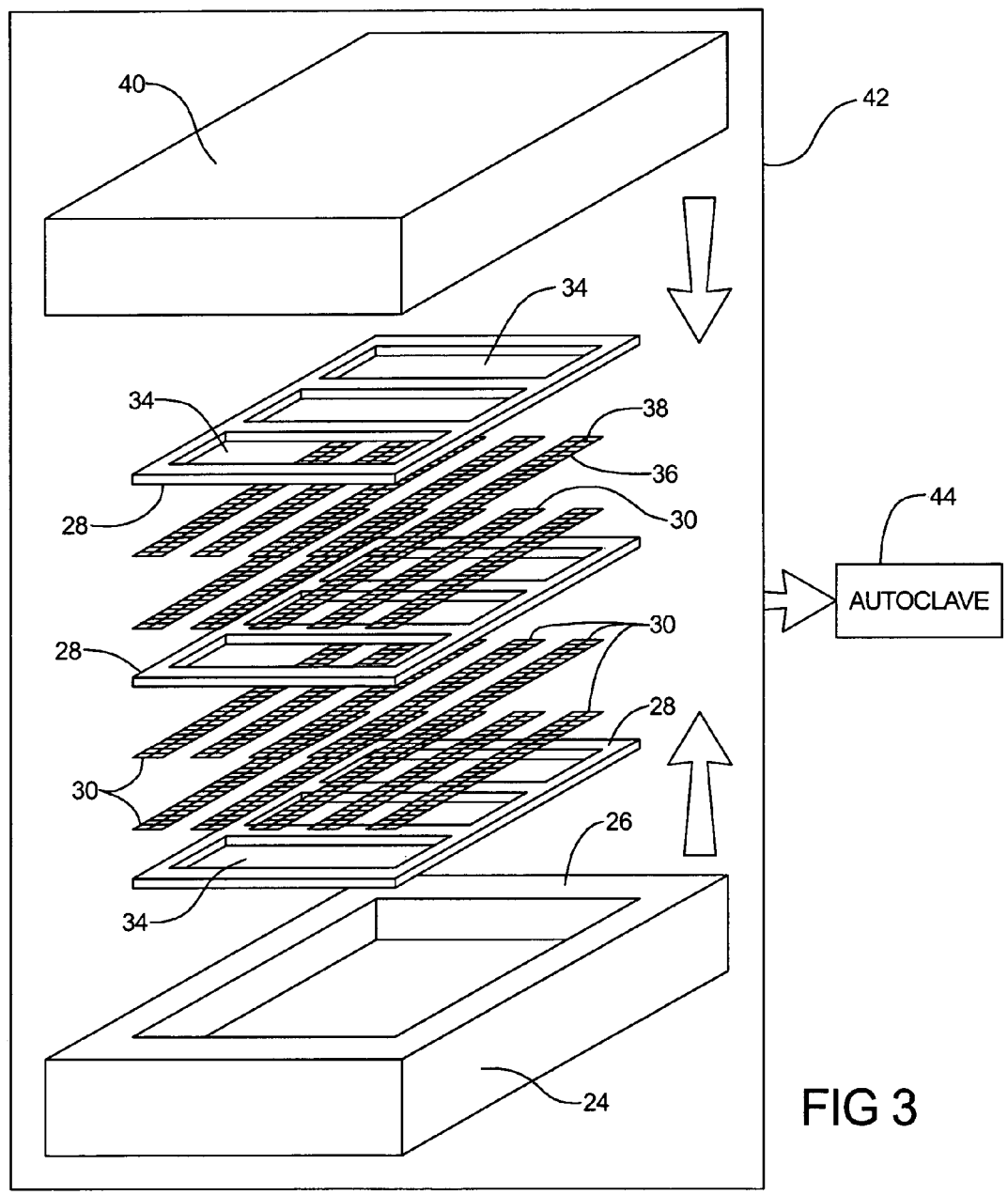
FIG. 3 is an exploded perspective view of the materials used to construct the transparent window skin panel of FIG. 2.

Turning now to FIG. 3, the method of constructing the transparent window skin panel 10 will now be described. A molding tool 24 is provided, illustrated schematically in FIG. 3, capable of receiving the components of the transparent window skin panel 10. The tool 24 has a smooth polished surface 26 shaped to form the outer surface of the transparent window skin panel 10. Alternatively, a glass mold may be used to form the smooth outer surface of the tool 24. The shape of the transparent window skin panel 10, while illustrated as essentially rectangular and flat in FIGS. 1 and 2, may comprise any shape. For example, the windows could comprise round, square or oval shapes, if desired.

The plurality of metal sheets 28 and a plurality of fiber pre-impregnated tapes (pre-preg tapes) 30 are then provided. Each metal sheet 28 includes a plurality of openings 34 formed therethrough. The openings 34 in each metal sheet 28 correspond to one of the windows 16 of the assembled transparent window skin panel 10. Again, while the openings 34 (and therefore the windows 16) are illustrated as rectangular, it is to be understood that any shape may be employed.

The metal sheets 28 are preferably made of aluminum due to its light weight and high strength, although various other metals may be employed including, for example, titanium. Preferably, the metal sheets 28 are constructed from metal foil tape laid out to form the shape of the metal sheet 28. In an alternative embodiment, the metal sheets 28 may be constructed of a solid sheet of metal.

The pre-preg tapes 30 each include a plurality of fibers 36 impressed and impregnated in a resin film 38 (also seen in FIG. 2). The orientation of the fibers 36 is based on the desired directional strength of the resulting structure and may have unidirectional or bi-directional strength (e.g., the fibers 36 may run either in one direction or a plurality of directions). Preferably, the fibers 36 are comprised of fiberglass having a rectangular cross section, although any number of suitable fiber materials and shapes may be employed.

The resin 38 is preferably an aliphatic epoxy resin although various other resins that are generally transparent when fully cured may be employed. Moreover, the resin 38 is transparent. The pre-preg tapes 30 are preferably about ⅛" (3.175 mm) to about 12" wide (304.8 mm), although any sized tape may be employed.

The metal sheets 28 and the pre-preg tapes 30 are then laid atop the tool 24 in an order corresponding to the desired order of lamina in the transparent window skin panel 10. In the particular example provided, the metal sheets 20 alternate with double layers of the pre-preg tape 30.

A flexible caul plate 40 (illustrated schematically in FIG. 3) is then closed onto the components. A vacuum bag 42 is then used to seal the tool 24, the pre-preg tape 30, and the metal sheets 28 and the air removed under suction. Finally, the components are placed in an autoclave 44 (illustrated schematically in FIG. 3).

The components are heated to preferably approximately 350 degrees Fahrenheit under a pressure of approximately 100 to 200 psi. However, it is to be understood that other temperatures and pressures may be employed. Within the autoclave, the resin 38 melts and flows through the fibers 36 thereby fully wetting (e.g. fully covering and saturating) the fibers 36 and metal sheets 28. The transparent window skin panel 10 is then cured over a period of time until the resin 38 hardens. The components are then removed from the autoclave 44, vacuum bag 42, and the tool 24 and caul plate 40 and the transparent window skin panel 10 removed. The metal sheets 28 correspond to the metal sheets 20 within the frame 14 (FIG. 2) and the resin 38 and fibers 36 make up the fiber reinforced resin 22 (FIG. 2).

As noted above, the window 16 (FIGS. 1 and 2) is transparent. To impart transparency, the resin 38 is transparent and the fibers 36 have a index of refraction such that they are substantially transparent within the transparent window skin panel 10. The index of refraction of the fibers 36 is matched to the index of refraction of the resin 38. In this way, the transparent window skin panel 10 is fully transparent in the areas of the openings 34 in the metal sheets 28.

By integrally forming the transparent reinforced resin 22 of the window 16 with the metal sheets 20 of the frame 14, a solid and high strength transparent window skin panel 10 is provided. Simultaneously, the heavy support structure typically used to frame aircraft windows is substantially eliminated, thus reducing the weight of the aircraft. This in turn allows for larger windows to be employed, if desired, without increasing the cost and weight of the aircraft.

While the present invention has been described in connection with aircraft windows, it will be appreciated that the invention can be incorporated on other forms of mobile platforms such as buses, trains, ships, etc., where composite panels may be employed. The present invention is also readily useable on fixed structures where lightweight panels having window portions are needed.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of forming a structural window panel for an airborne mobile platform, comprising:

using a plurality of non-fibrous, metal sheets to form a frame structure, wherein the metal sheets define a continuous peripheral edge forming an opening therein;

providing a plurality of layers of generally optically transparent fiber pre-impregnated resin tape, where a resin of the tape comprises an aliphatic epoxy resin, and has an index of refraction that generally matches an index of refraction of a plurality of fibers of said tape;

interleaving said plurality of layers of generally optically transparent, fiber pre-impregnated resin tape between the metal sheets to substantially cover an entire surface portion of each one of the metal sheets and to fill the opening, the layers of pre-impregnated resin tape extending substantially to outer peripheral edges of the metal sheets;

heating the metal sheets and the fiber pre-impregnated resin tape layers as a unitary assembly within a tool such that the resin in each said pre-impregnated tape layer melts and substantially covers the metal sheets and fills the opening, said layers of optically transparent fiber pre-impregnated resin tape, said metal sheets and said aliphatic epoxy resin imparting a needed degree of structural strength to the window panel; and once cured, the generally transparent, fiber pre-impregnated resin tape layers and metal sheets form a structural panel having a see-through window portion in the frame structure.

2. The method of claim 1, wherein the fiber pre-impregnated resin tape layers each comprises a plurality of fibers impressed into a resin tape.

3. The method of claim 2, wherein the fibers are comprised of fiberglass.

4. The method of claim 1, wherein each said metal sheet comprises a plurality of metal foil strips.

5. The method of claim 1, wherein each said metal sheet is comprised of aluminum.

6. The method of claim 1, wherein each said metal sheet is comprised of titanium.

7. The method of claim 1, wherein each said metal sheet forms an opening, said openings corresponding to a window.

8. The method of claim 1, wherein the fiber pre-impregnated resin tape has a width of approximately ⅛" (3.175 mm) to about 12" (304.8 mm).

9. A method of manufacturing a fuselage having a transparent window skin panel for use with an airborne mobile platform, comprising:

providing a tool;

providing a pre-impregnated resin tape comprised of a plurality of fibers a impregnated with a transparent aliphatic epoxy resin, and where said plurality of fibers has an index of refraction that generally matches an index of refraction of a said aliphatic epoxy resin of said tape;

providing a non-fibrous, metal sheet having a plurality of spaced apart openings formed therein;

layering the pre-impregnated resin tape and the metal sheet onto the tool such that the metal sheet and the pre-impregnated resin tape are aligned one atop the other, such that the pre-impregnated resin tape completely covers the openings and overlays substantially an entire outer surface of the metal sheet;

heating the tool, the metal sheet, and the pre-impregnated resin tape such that the resin flows to substantially cover an entirety of the metal sheet and the fibers, the resin and fibers being substantially transparent to form a plurality of see-through window portions in the skin panel in the spaced apart openings; and removing the skin panel from the tool and securing it to a portion of a fuselage of said airborne mobile platform.

10. The method of manufacturing a transparent window skin panel of claim 9, wherein providing a pre-impregnated resin tape, providing a metal sheet, and layering the pre-impregnated resin tape and the metal sheet onto the tool comprises using a plurality of metal sheets and a plurality of layers of pre-impregnated resin tape, and arranging the metal sheets and layers of pre-impregnated resin tape in alternating layers.

11. The method of manufacturing a transparent window skin panel of claim 9, wherein applying the pre-impregnated resin tape within any given layer comprises sandwiching a plurality of fiber pre-impregnated resin tape layers one adjacent another to fully cover the metal and to fully fill the openings in the metal sheet.

12. The method of manufacturing a transparent window skin panel of claim 9, wherein the metal sheet is comprised of aluminum.

13. The method of manufacturing a transparent window skin panel of claim 9, wherein the metal sheet is comprised of titanium.

14. The method of manufacturing a transparent window skin panel of claim 9, wherein the fibers are comprised of fiberglass.

15. The method of manufacturing a transparent window skin panel of claim 9, wherein the metal sheet comprises a plurality of metal foil strips.

16. The method of manufacturing a transparent window skin panel of claim 9, wherein the pre-impregnated resin tape has a width of approximately ⅛" (3.175 mm) to about 12" (304.8 mm).

17. The method of manufacturing a transparent window skin panel of claim 16, wherein the autoclave heats the tool, the metal sheet, and the pre-impregnated resin tape to approximately 350 degrees Fahrenheit under approximately 100 to 200 psi of pressure.

18. The method of manufacturing a transparent window skin panel of claim 9, further comprising placing a caul plate atop the metal sheet, the pre-impregnated resin tape, and the tool.

19. The method of manufacturing a transparent window skin panel of claim 18, further comprising placing the caul plate, the metal sheet, the pre-impregnated resin tape, and the tool into a vacuum bag and removing the air therein.

20. The method of manufacturing a transparent window skin panel of claim 9, wherein heating the tool, the metal sheet, and the pre-impregnated resin tape comprises using an autoclave.

* * * * *